(12) United States Patent
Kim

(10) Patent No.: US 6,510,127 B1
(45) Date of Patent: Jan. 21, 2003

(54) METHOD AND APPARATUS FOR SEQUENTIALLY REPRODUCING OPTICAL RECORDING MEDIA

(75) Inventor: Si-Weon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/172,031

(22) Filed: Oct. 14, 1998

(30) Foreign Application Priority Data

Dec. 27, 1997 (KR) .......................................... 97-81860

(51) Int. Cl.⁷ ................................................ G11B 7/24
(52) U.S. Cl. ............................... 369/275.2; 369/30.04; 386/96
(58) Field of Search ................................ 369/32, 275.3, 369/275.2, 58, 47, 48, 54, 30, 30.28, 47.54, 126, 30.08, 30.04, 30.09, 53.17, 30.07; 360/59, 32, 48; 386/96, 106

(56) References Cited

U.S. PATENT DOCUMENTS 5,237,553 A * 8/1993 Fukushima et al. ........... 369/58
5,491,592 A * 2/1996 Aramaki et al. ............... 360/59
5,687,160 A * 11/1997 Aotake et al. ........... 369/275.3
5,712,949 A * 1/1998 Kato et al. ..................... 386/96
5,737,308 A * 4/1998 Nakai et al. ............. 369/275.2
5,802,018 A * 9/1998 Kim et al. ..................... 369/30

* cited by examiner

*Primary Examiner*—Ali Neyzari
(74) *Attorney, Agent, or Firm*—Birch, Stewart, Kolasch & Birch, LLP

(57) ABSTRACT

A method for sequential reproducing of a rewritable optical disc including a plurality of sessions, each session having at least one attribute information, the method including the steps of a) reading the attribute information of multiple sessions recorded on an optical disc; and b) determining whether to automatically reproduce subsequent sessions based on the read attribute information. Additional key inputs or selection requests, which are conventionally required to invoke reproduction of sessions subsequent to the selected session, can be avoided when the user wishes to reproduce information (e.g., music) from an optical disk in which data is recorded in different sessions by the user and in which data having the same attributes may occur sporadically.

20 Claims, 2 Drawing Sheets

METHOD AND APPARATUS FOR SEQUENTIALLY REPRODUCING OPTICAL RECORDING MEDIA

BACKGROUND OF INVENTION

1. Field of the Invention

The present invention relates to a method for reproducing information from a rewritable optical disc. More specifically, the present invention relates to a method for reproducing multiple sessions of a rewritable optical disc without requiring the user to perform multiple key operations.

2. Description of Related Art

A multi-session rewritable optical disc is a writable optical disc having multiple-sessions in which data having many different attributes (e.g., audio, video, or text information, etc.) can be rewritten by a user.

FIG. 1 is a schematic diagram of a conventional player for reproducing data stored on a multi-session rewritable optical disc. Referring to FIG. 1, a pick-up 11 reads recording signals from the surface of a multi-session rewritable optical disc. A driver 13 drives both the pick-up 11 and a motor M. The R/F unit 12 filters and normalizes the signals detected by the pick-up 11. A servo unit 20 simultaneously controls the driver 13 using an output signal from the R/F unit 12 and the rotation rate of the multi-session rewritable optical disc, and detects synchronization of the output signal from the R/F unit 12. Based on the detected synchronization, a digital signal processor (DSP) 30 uses the signal read by the R/F unit 12 to generate an original digital signal and corresponding data. The DSP 30 outputs the corresponding data which will usually have attributes from the original data according to a data format. Typically, the corresponding data may consist of MPEG data, text data and PCM data. The corresponding data from the DSP 30 is input into an MPEG decoder 40 or an output data converter 41, depending on the type of data. The MPEG decoder 40 decodes the data (which is in compressed form) and outputs the decoded data as moving picture data or audio data or both. The output data converter 41 converts the recovered data having PCM information or text frames into audio or character data, and outputs the converted audio or character data. A microprocessor 50 controls the overall components described above such as the pick-up 11, the R/F unit 12, the driver 13, the servo unit 20, the DSP 30, the MPEG decoder 40, and the output data converter 41, etc., according to key entry by the user. A memory 51 stores session recording information of the multi-session rewritable optical disc 10.

In the multi-session optical disc player described above, when the multi-session rewritable optical disc 10 is initially inserted into the player, the microprocessor 50 controls the pick-up 11 via the servo unit 20 and the driver unit 13 to move to the track 0 (Lead-In region) of the disc 10 and to read the recorded session information on that track. The session information may include information such as starting and ending positions of each session, attribute information of each session (audio, video, or text information, etc.), and track number information of each session. The pick-up 11 detects the session information. The R/F unit 12 filters and normalizes the R/F signals of the session information detected by the pick-up 11. Then, the servo unit 20 detects synchronization of the filtered and normalized signals. The DSP 30 converts the R/F signals output from the R/F unit 12 into original digital data using the detected synchronization.

The microprocessor 50 stores the information of each session included in the disc 10 into the memory 51. When a user selectively inputs a request to play a session, the microprocessor 50 drives the driver unit 13 via the servo unit 20 to move the pick-up 11 to the start position of the selected session. After that, the microprocessor 50 reads the data in the selected session using the session information stored in the memory 51.

The pick-up 11 reads information such as moving picture, audio, or text information from the desired track. Then, the R/F unit 12 filters and normalizes the data, and the DSP 30 recovers the filtered and normalized data using a data synchronization which is detected by the servo unit 20. The recovered data is selectively output to the MPEG decoder 40 or to the output data converter 41 according to data attributes of the corresponding session. The compressed data input into the MPEG decoder 40 is decoded and reproduced as a moving picture, while PCM information or text frames inputted into the output data converter 41 are converted into audio signal or character.

The reproduction of the selected session will be continued until the pick-up reaches the end of the selected session or the end of the sequential data with the same attribute, assuming there is no user's request to stop during the play of the selected session. When there is a request to stop the play of the selected session, the microprocessor 50 controls the pick-up 11 via servo unit 20 and driver unit 13. At the same time, the microprocessor stops the DSP 30 from recovering the data and finally from playing the selected or next session.

In the conventional playing method as described above, even if no user request is input to stop reproduction, reproduction of a selected session is automatically stopped when reproduction of that selected session is completed. Thus, if the user desires to play the next session having the same attribute, the user must take an additional step to request reproduction of that next session, thus burdening the user.

SUMMARY OF THE INVENTION

The present invention is directed to system that substantially obviates one or more of the problems experienced due to the above and other limitations and disadvantages of the related art.

An object of the present invention is to provide a method for reproducing multiple sessions recorded on a rewritable optical disc, such that automatic playing of subsequent sessions occurs without any additional requests by the user if those subsequent sessions have the same attribute as the first reproduced session which is previously selected for reproduction and when reproduction of the selected session is completed.

Other and further objects, features and advantages of the present invention will be set forth in the description that follows, and in part will become apparent from the detailed description, or may be learned by practice of the invention.

To achieve these and other advantages and in accordance with the purpose of the present invention, as embodied and broadly described, the present invention includes a method for reproducing plural sessions of a rewritable optical disc having at least one common attribute information which includes reading the attribute information of at least two sessions included in the optical disc, and comparing the attribute information read to determine whether reproduction of more than one of the sessions should be automatically performed.

In accordance with another aspect of the invention, a method for reproducing plural sessions of a rewritable optical disc includes receiving a selection of a session to be reproduced, reading and storing attribute information of the selected session, reproducing the selected session, determining whether the reproduction of the selected session is completed, reading attribute information of a subsequent session when reproduction of the selected session is determined to be completed, comparing the attribute information read from the subsequent session with the attribute information of the selected session, determining whether the attribute information of the subsequent session includes at least part of the attribute information of the selected session, and reproducing the subsequent session when the attribute information thereof includes at least part of the attribute information of the selected session. When the attribute information of the subsequent session includes at least part of the attribute information of the selected session, the method further includes determining whether reproduction of the subsequent session is completed, determining whether a second subsequent session exists when reproduction of the subsequent session is determined to be complete, reading attribute information of the second subsequent session if the second subsequent session exists, comparing the attribute information read from the second subsequent session with the attribute information of the subsequent session, determining whether the attribute information of the second subsequent session includes at least part of the attribute information of the subsequent session, and reproducing the second subsequent session when the attribute information thereof includes at least part of the attribute information of the subsequent session. When the attribute information of the subsequent session is not determined to include at least part of the attribute information of the selected session, the method further includes determining whether a second subsequent session following the subsequent session exists, reading attribute information of the second subsequent session, comparing the attribute information read from the second subsequent session to the attribute information of the selected session to determine whether the attribute information of the second subsequent session includes at least part of the attribute information of the selected session, and reproducing the second subsequent session when the attribute information thereof includes at least part of the attribute information of the selected session. Note that when a second subsequent session is determined not to exist, reproduction is stopped.

In either embodiment, the attribute information can be at least one of audio, video, or text information. Furthermore, the subsequent session may be a next sequential session that is adjacent to the selected session or it may be positioned otherwise. Similarly, the second subsequent session may be a next sequential session that is adjacent to the subsequent session or it may be positioned otherwise.

Further scope of applicability of the present invention will become apparent from the detailed description given hereinafter. However, it should be understood that the detailed description and specific examples, while indicating preferred embodiments of the invention, are given by way of example only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Reference will now be made in detail to the preferred embodiments of the present invention, examples of which are illustrated in the accompanying drawings.

Figure 1:
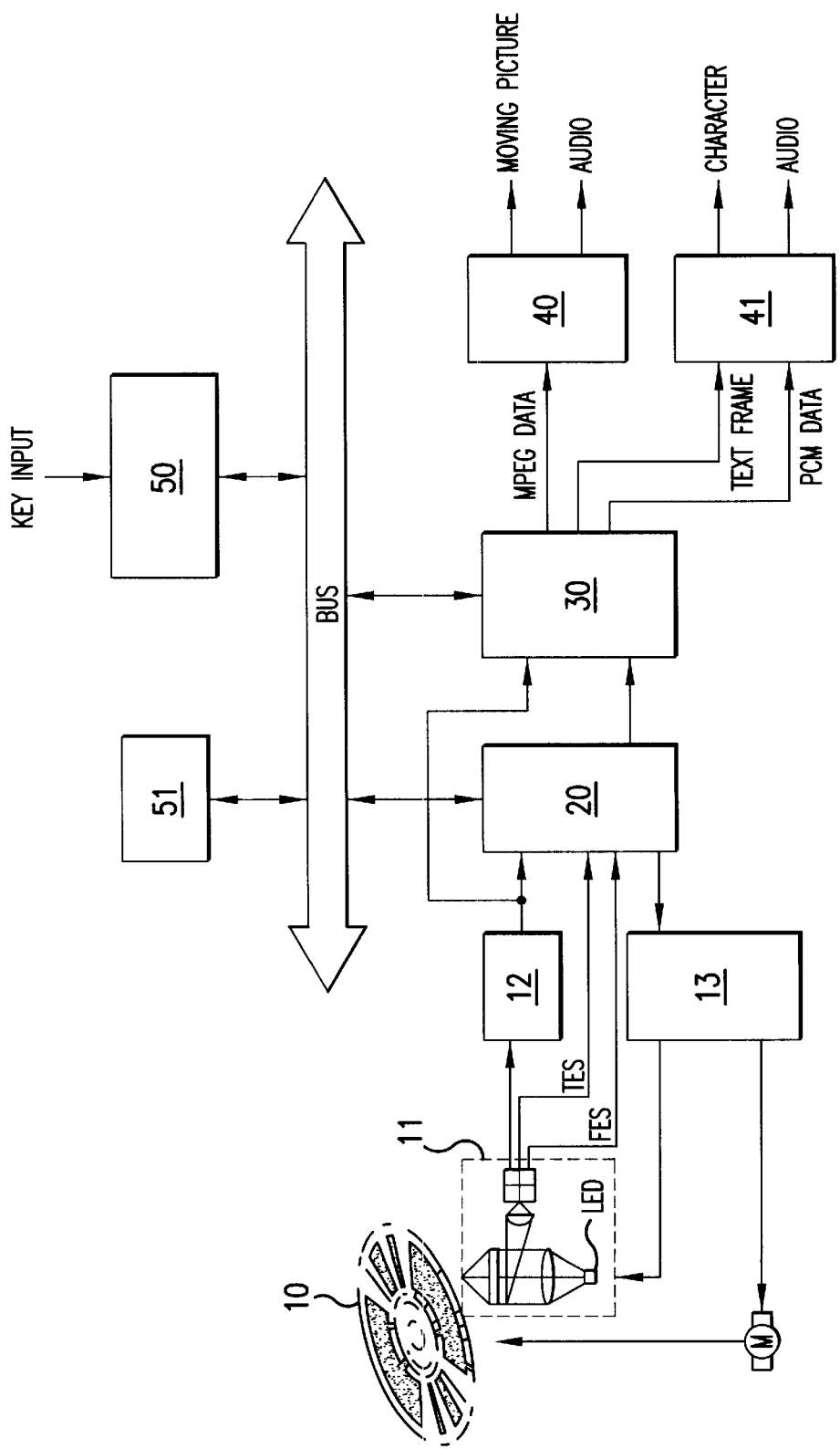
FIG. 1 is a schematic diagram of a conventional player for reproducing information from a multi-session rewritable optical disc including data having multiple attributes.
Figure 2:
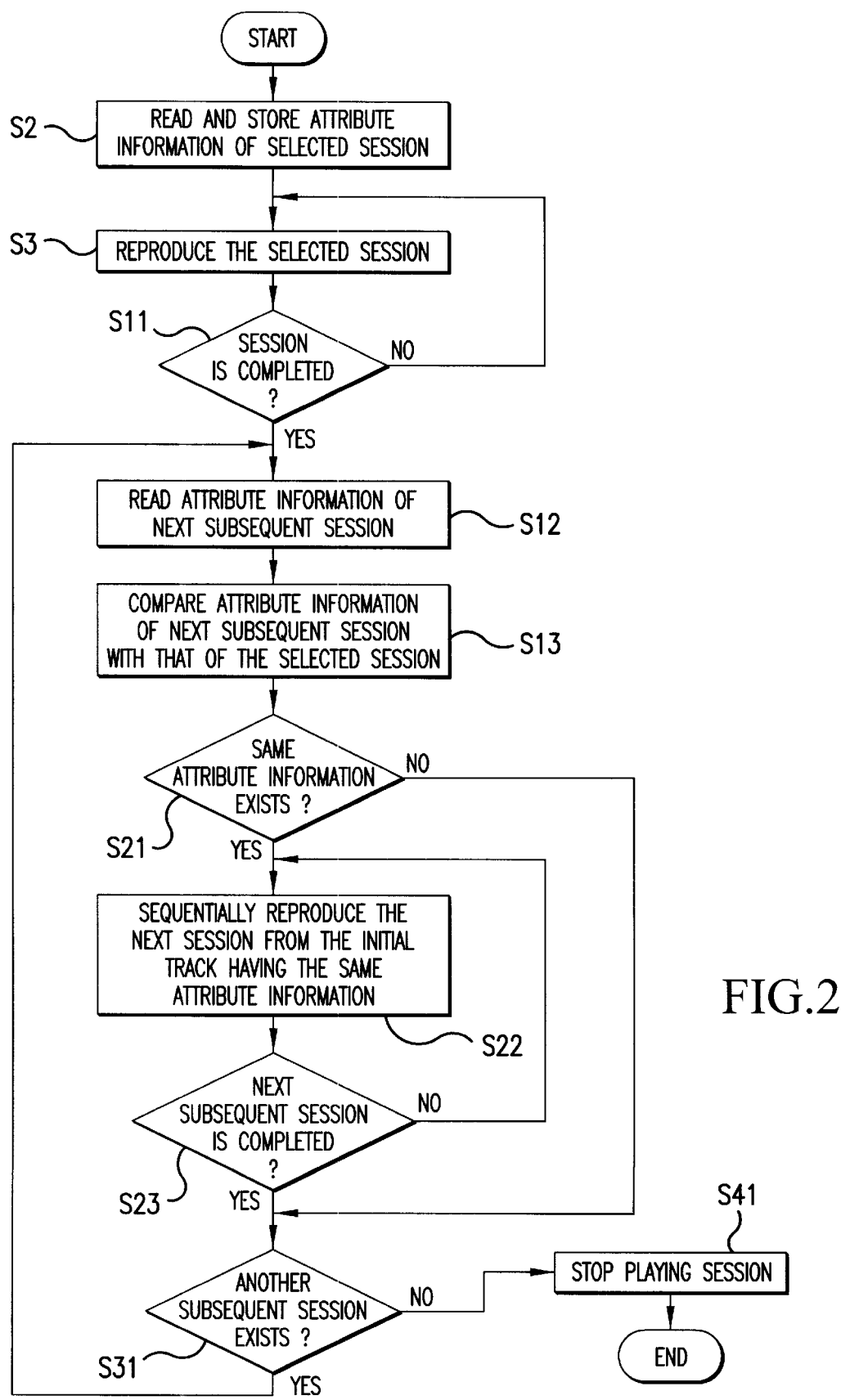
FIG. 2 is a flowchart of a method for reproducing information from a rewritable optical disc in accordance with the present invention.

FIG. 2 shows a flowchart of a method for reproducing information from a rewritable optical disc in accordance with an exemplary embodiment of the present invention. Therefore, referring to FIGS. 1 and 2, a sequential playing method in accordance with the invention will be described in more detail.

A procedure for performing the method for reproducing information from a rewritable optical disc having a plurality of sessions in accordance with the invention starts with a user's request to select and play a session. In response to such a request, management data having, for example, the position information of the sessions, which is stored and formed in the lead-in region of a multi-session rewritable optical disc, are read and stored in the memory 51 (S2). The selected session is reproduced after its position is determined from the session management data stored in the memory 51 (S3). While the selected session is being reproduced, step S11 determines whether reproduction of the selected session is completed or not. The procedure returns to step S3 when reproduction of the selected session is ongoing. However, when reproduction of the selected session is determined to be complete in step S11, the microprocessor 50 reads attribute information included in the next session (S12), using the management data of the next session which is stored in the selected session. Then, the microprocessor 50 compares the attribute information of the next session with the attribute information included in the previously selected and reproduced session (S13). As a result of the comparison, determination is made whether the same attribute information is included in both the previously selected session and the next session (S21).

For example, assume that the previously selected session is a first session having an audio attribute and the next session is a second session having both text and audio attributes. In this case, it will be determined that the same attribute e.g., audio, is included in both the previously selected session and the next session (S21). Since both include the same attribute, the microprocessor 50 reads the management data of the next session and identifies the first track position of the audio data included in the next session. Then, the microprocessor 50 moves the pick-up 11 to the identified track position by controlling the driver 13 via servo unit 20 and reads the audio data of that next session. The read audio data is output as an analog audio signal via the output data converter 41. With this procedure, reproduction of a subsequent (e.g., the next or second) session may be sequentially and automatically performed (S22). Completed reproduction of the subsequent session is detected in step S23. Following reproduction of the subsequent session, the process proceeds to step S31.

However, if the result is negative in step S21 (e.g., the subsequent session consists of only text attribute), processing proceeds to step S31 without reproducing information from within that subsequent session.

In step S31, the microprocessor 50 reads the session data information from the memory 51 and identifies whether another subsequent session exists on the optical disk. If another session is determined to exist in step S31, the procedure returns to step S12 where attribute information of yet another next session (a second subsequent session) is read for comparison purposes. More specifically, when returned to step S12 the sequential steps beginning with step S12 are performed to read and identify the attribute information of the next subsequent session, and to determine whether to automatically reproduce that next subsequent session. This process continues until other sessions are determined not to exist in step S31, indicating that the currently playing session is the final one. Then, reproduction will proceed to step S41 where it is stopped.

For instance, if a multi-session rewritable optical disc includes three sessions, the first and third of which have in common attributes, the following process will be performed by this embodiment of the present invention in response to a selection of the first session or corresponding information. In step S2, the attribute information of the first session is read and stored. The information stored in the first session is reproduced in steps S3 and S11. Once the first session is completely reproduced, attribute information of the second session is read in step S12 and compared to the attribute information of the first session in step S13. The attribute information of the first and second sessions is determined to be different in step S21. Thus, step S31 is performed to determine whether another session exists. When the third session is detected in step S31, the process proceeds to steps S12 and S13 where the attribute information of the third session is read and compared with the attribute information of the first session, respectively. Since the same attribute information exists, (step S21), processing proceeds to reproduce the information from the third session in steps S22 and S23. After the information has been completely reproduced from the third session, processing proceeds to step S31 to determine whether yet another session exists. Since the third session is the final session, processing proceeds to step S41 where reproduction is stopped.

As described with respect to the above embodiments of the present invention, a plurality of sessions having the same attribute can be sequentially reproduced without any additional key input or selection request by the user, even when the reproduction of one session is completed. Accordingly, in the present invention, additional key inputs or selection requests which were conventionally required can be avoided when the user desires to play the music CD in which data is selectively and intermittently recorded in different sessions by the user and the play of data with the same attribute may occur sporadically. That is, unlike conventional systems, the present invention is capable of automatically reproducing a series of data sessions having a common attribute, whether or not those sessions are adjacent or sequential.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. A method for reproducing an optical disc having at least two sessions recorded thereon, each session being separate from one another, the method comprising:

reading attribute information of at least two sessions included in the optical disc; and comparing the attribute information read to determine whether reproduction of more than one of the sessions should be automatically performed.

2. The method of claim 1, wherein the attribute information includes at least one of audio, video, and text information.

3. A method for reproducing an optical disc having at least two sessions recorded thereon, each session being separate from one another, the method comprising:

receiving a selection of a session to be reproduced;

reading and storing attribute information of the selected session;

reproducing the selected session;

determining whether reproduction of the selected session is completed;

reading attribute information of a subsequent session if reproduction of the selected session is determined to be complete and a request to stop reproduction has not been received;

comparing the attribute information read from the subsequent session with the attribute information of the selected session;

determining whether the attribute information of the subsequent session includes at least part of the attribute information of the selected session; and reproducing the subsequent session when the attribute information of the subsequent session includes at least part of the attribute information of the selected session.

4. The method recited by claim 3, wherein, when the attribute information of the subsequent session includes at least part of the attribute information of the selected session, the method further comprises;

determining whether reproduction of the subsequent session is completed;

determining whether a second subsequent session exists when reproduction of the subsequent session is determined to be completed;

reading attribute information of the second subsequent session if the second subsequent session exists and a request to stop reproduction has not been received;

comparing the attribute information read from the second subsequent session with the attribute information of the subsequent session;

determining whether the attribute information of the second subsequent session includes at least part of the attribute information of the subsequent session; and reproducing the second subsequent session when the attribute information of the second subsequent session includes at least part of the attribute information of the subsequent session.

5. The method of claim 3, further comprising:

continuing to reproduce the selected session while reproduction of the selected session is not determined to be completed.

6. The method of claim 4, further comprising:

continuing to reproduce the subsequent session while reproduction of the subsequent session is not determined to be completed.

7. The method of claim 3, wherein, when the attribute information of subsequent session is not determined to include at least part of the attribute information of the selected session, the method further comprises:

determining whether a second subsequent session following the subsequent session exists;

reading attribute information of the second subsequent session, and comparing the attribute information read from the second subsequent session to the attribute information of the selected session to determine whether the attribute information of the second subsequent session includes at least part of the attribute information of the selected session; and reproducing the second subsequent session when the attribute information of the second subsequent session includes at least part of the attribute information of the selected session.

8. The method of claim 7, further comprising;

stopping reproduction if a second subsequent session is not determined to exist.

9. The method of claim 4, further comprising;

stopping reproduction if a second subsequent session is not determined to exist.

10. The method of claim 4, wherein the attribute information is at least one of audio, video and text information.

11. The method of claim 5, wherein the attribute information is at least one of audio, video and text information.

12. The method of claim 7, wherein the attribute information is at least one of audio, video and text information.

13. The method of claim 3, wherein the subsequent session is a next sequential session that is adjacent to the selected session.

14. A method for reproducing an optical disk having a plurality of data groups, the data groups having been recorded by intermittent recording, the method comprising:

reading attribute information of at least two data groups from the optical disc; and comparing the attribute information read to determine whether reproduction of more than one of the data groups should be automatically performed.

15. The method recited by claim 14, wherein the reading step reads attribute information of a selected data group and a subsequent data group; and when the comparing step determines that the attribute information of the subsequent data group includes at least part of the attribute information of the selected data group, the method further comprises;

determining whether reproduction of the subsequent data group is completed;

determining whether a second subsequent data group exists when reproduction of the subsequent data group is determined to be completed;

reading attribute information of the second subsequent data group if the second subsequent data group exists and a request to stop reproduction has not been received;

comparing the attribute information read from the second subsequent data group with the attribute information of the subsequent data group;

determining whether the attribute information of the second subsequent data group includes at least part of the attribute information of the subsequent data group; and reproducing the second subsequent data group when the attribute information of the second subsequent data group includes at least part of the attribute information of the subsequent data group.

16. The method of claim 14, wherein the reading step reads attribute information of a selected data group and a subsequent data group; and when the comparing step determines that the attribute information of the subsequent data group does not include at least part of the attribute information of the selected data group, the method further includes;

determining whether a second subsequent data group following the subsequent data group exists;

reading attribute information of the second subsequent data group, and comparing the attribute information read from the second subsequent data group to the attribute information of the selected data group to determine whether the attribute information of the second subsequent data group includes at least part of the attribute information of the selected data group; and reproducing the second subsequent data group when the attribute information of the second subsequent data group includes at least part of the attribute information of the selected data group.

17. An apparatus for reproducing an optical disc having at least two sessions recorded thereon, each session being separate from one another, the apparatus comprising:

a pick-up reading attribute information of at least two sessions included in the optical disc; and a processor comparing the attribute information read to determine whether reproduction of more than one of the sessions should be automatically performed.

18. An apparatus for reproducing an optical disk having a plurality of data groups, the data groups having been recorded by intermittent recording, the apparatus comprising:

a pick-up reading attribute information of at least two data from the optical disc; and a processor comparing the attribute information read to determine whether reproduction of more than one of the data groups should be automatically performed.

19. The apparatus of claim 17, wherein the attribute information includes at least one of audio, video, and text information.

20. The apparatus of claim 18, wherein the attribute information includes at least one of audio, video, and text information.

* * * * *